UNITED STATES PATENT OFFICE.

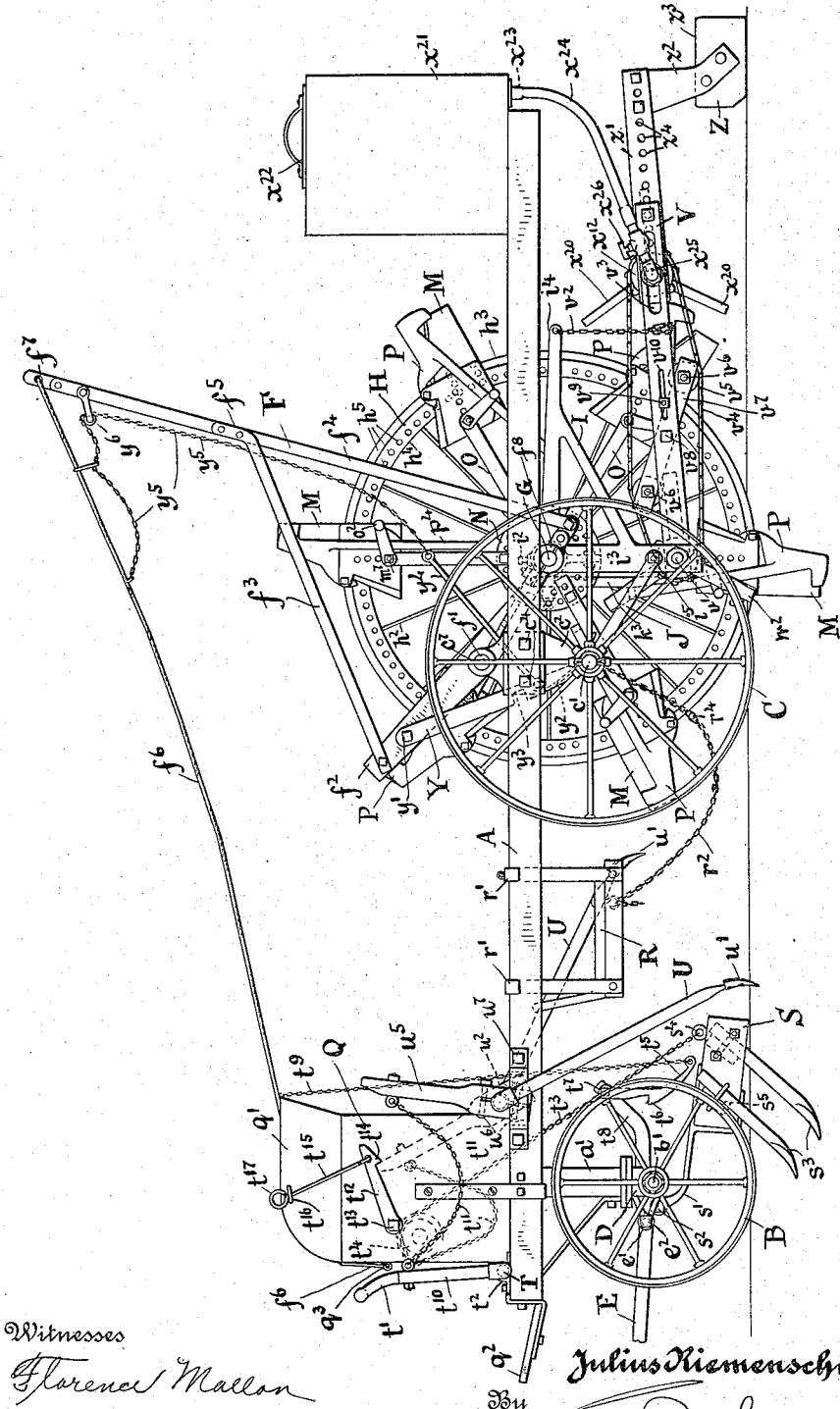

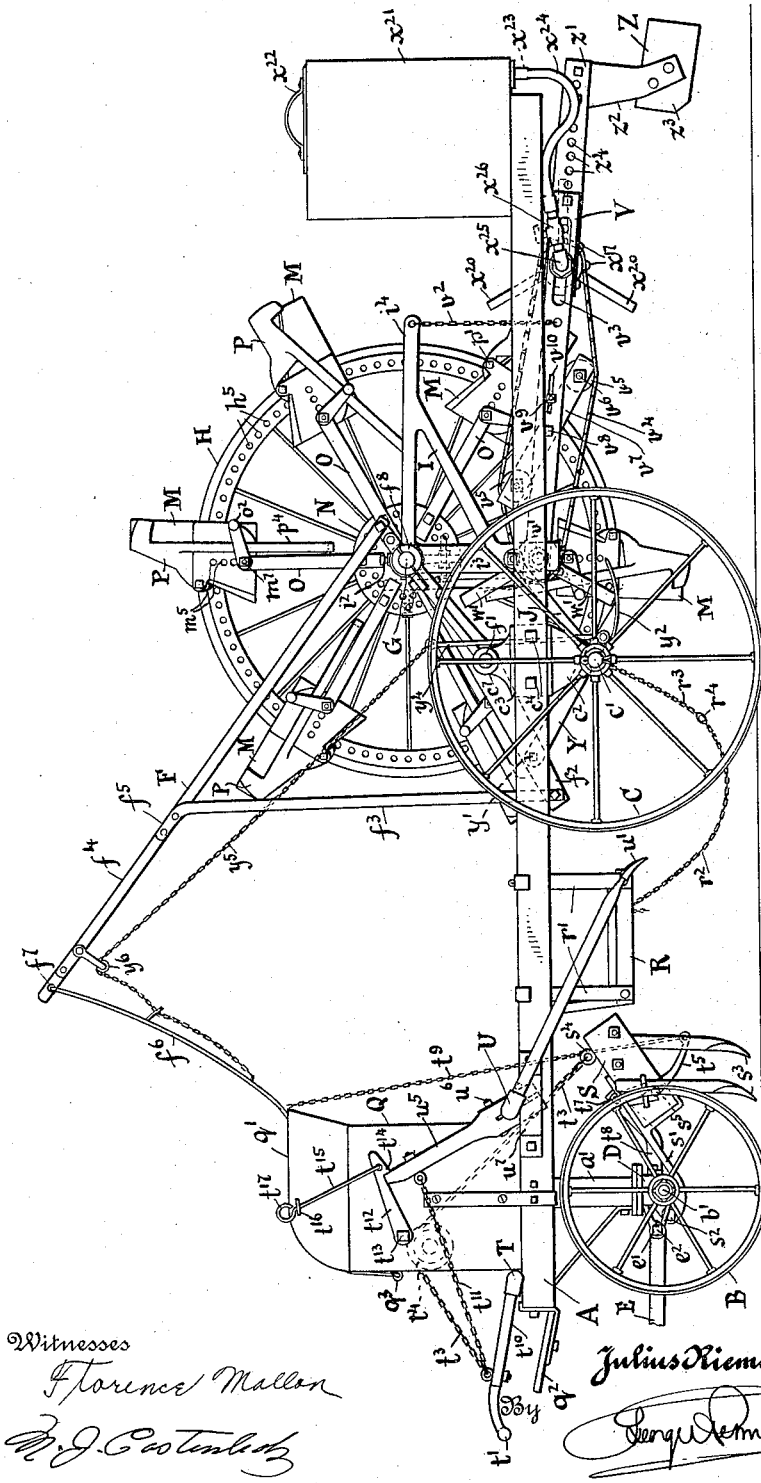

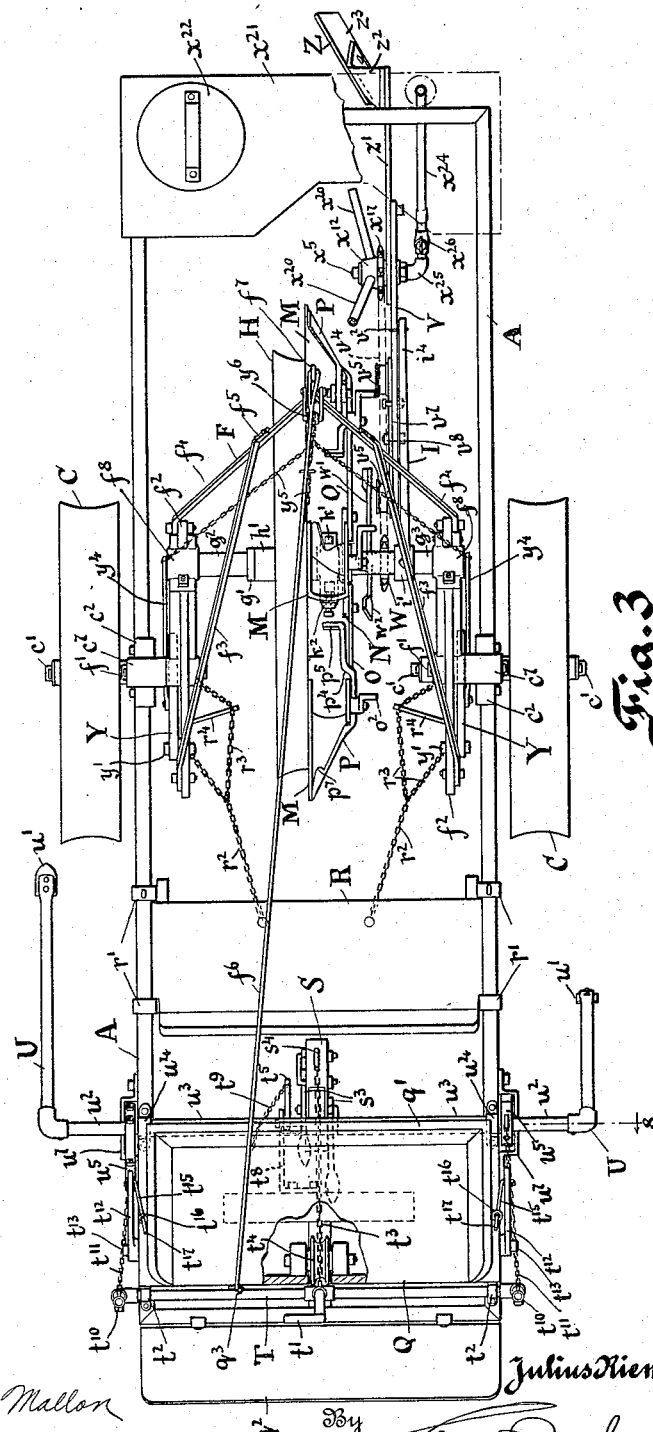

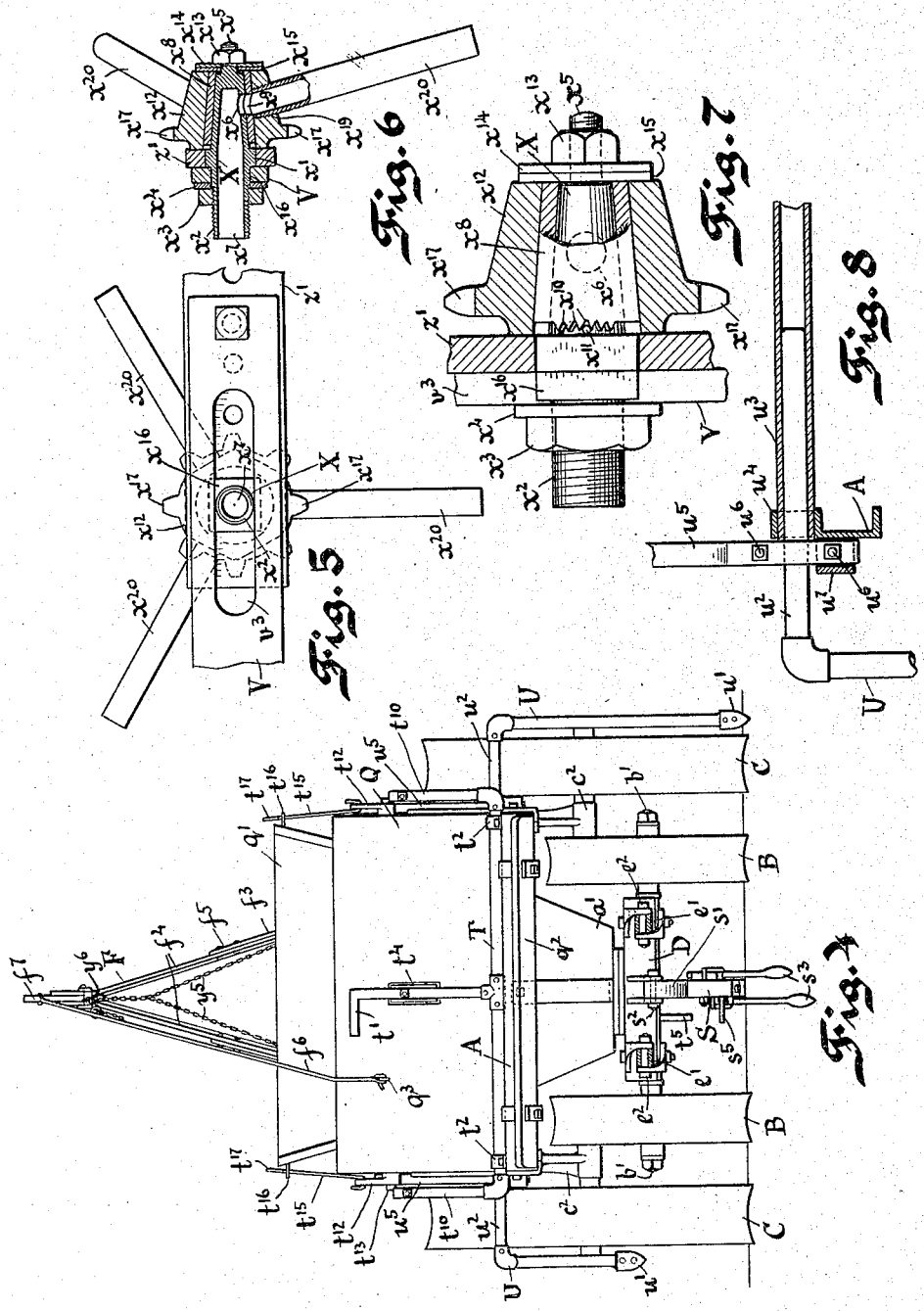

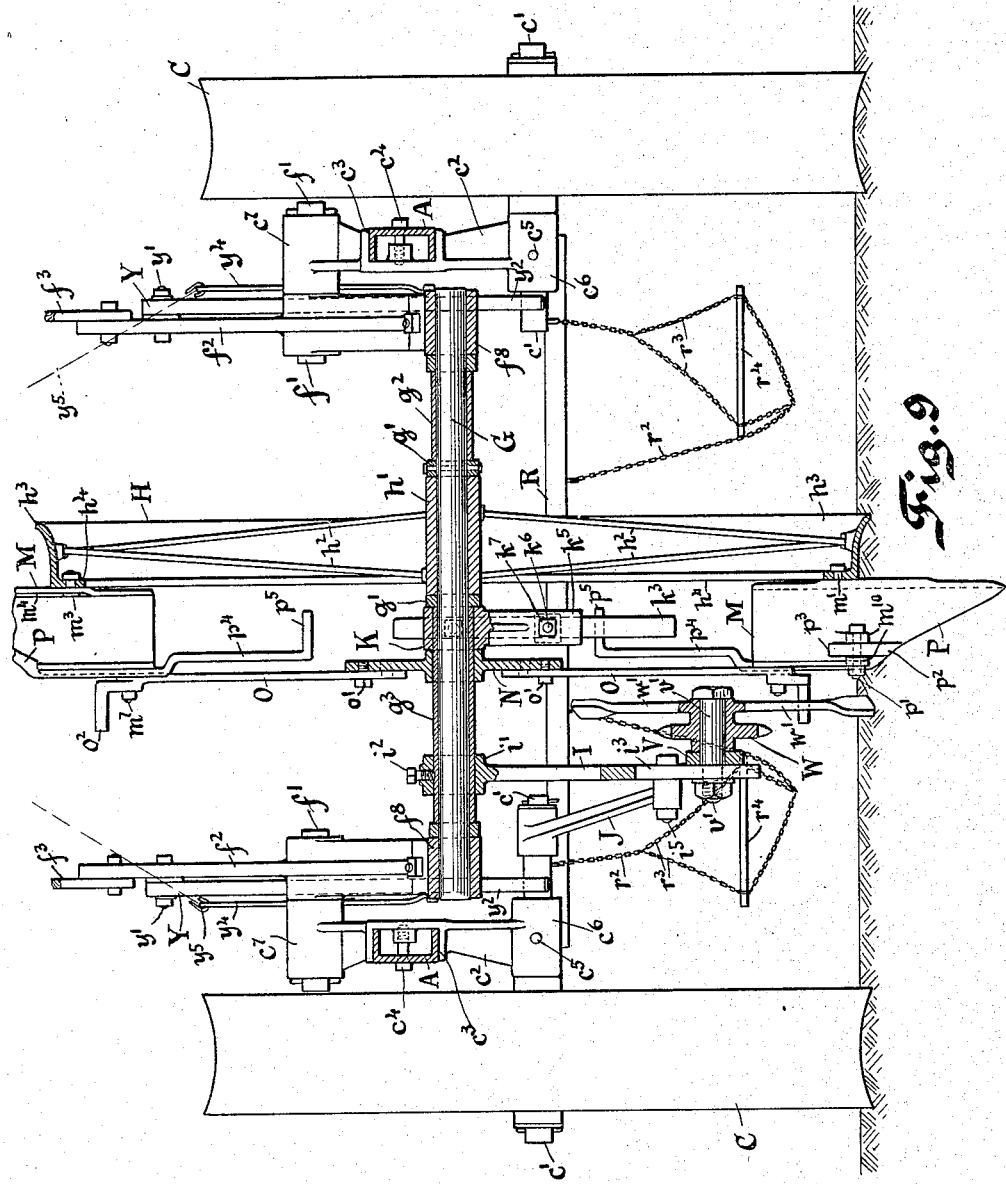

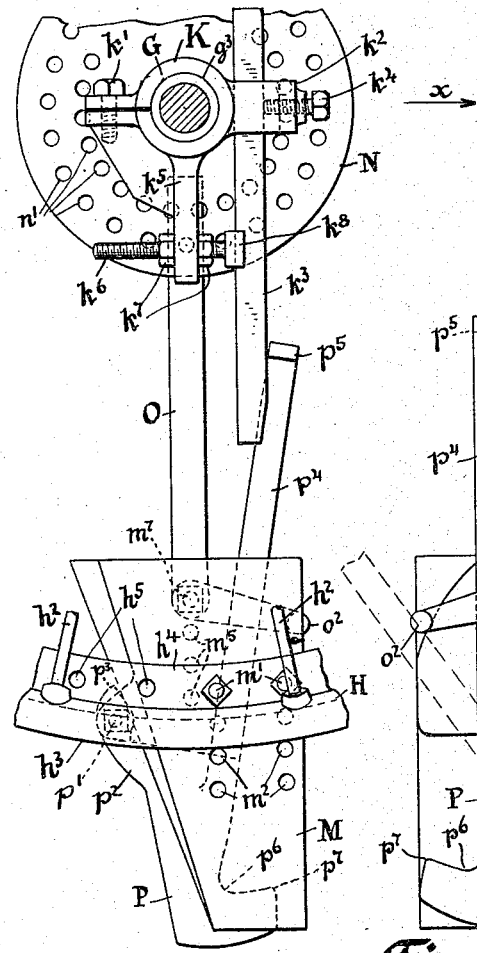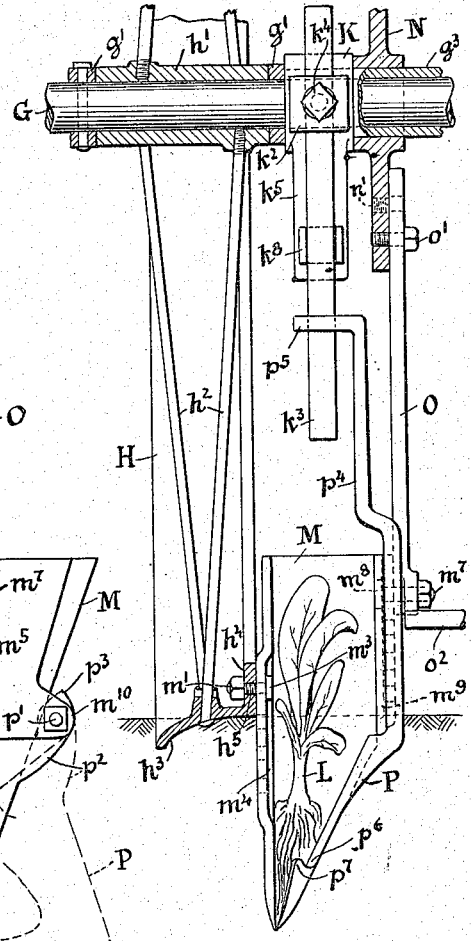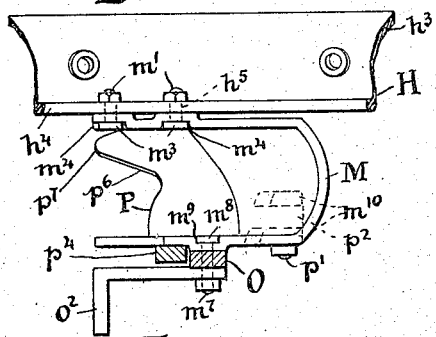

JULIUS RIEMENSCHNEIDER, OF MILWAUKEE, WISCONSIN.

PLANT-SETTING MACHINE.

1,174,283.  Specification of Letters Patent.  Patented Mar. 7, 1916.

Application filed February 13, 1912. Serial No. 677,377.

*To all whom it may concern:*

Be it known that I, JULIUS RIEMENSCHNEIDER, of Milwaukee, Wisconsin, have invented a Plant-Setting Machine, of which the following is a specification.

This invention relates to a machine for transplanting or rather for setting small plants, such as cabbage and tobacco plants, in the ground at regular intervals, and I purpose to provide a machine which can be simply and cheaply made, is capable of manifold adjustment, and which shall perform the work intended in a satisfactory manner. A large number of machines have been already invented for this purpose, but difficulties have always been found in their practical operation, more particularly with the setting of the plants in the ground. In many prior machines gripping-devices are employed which act like fingers to seize the plant and push the root into the ground, an operation which often results in the injury of the plant, or in failing to grasp the same properly. In my machine the construction is such that the plant is not gripped or seized at all, but is simply laid in an open box, which is carried on a wheel and which projects beyond the rim of the wheel, and on reaching the ground digs the hole for the plant, into which hole the plant is caused to drop by means which are provided for disengaging it from the box at the proper moment. I further provide means acting in conjunction with the plant-holding box to cover in the hole around the plant and press it down thereafter, said means comprising a share or scraper which travels immediately in the rear of the box-carrying wheel. Further, in the most improved form of my machine I provide means for breaking up the soil in advance of the plant-holding box (but not for making a furrow therein, the mode of operation of my machine being distinct from that of machines which make a preliminary furrow in which the plants are set) and for breaking up the soil at one side of the plant-holding box whereby loose soil is provided which can be readily thrown about said plant after being set, by means of the aforesaid scraper which follows.

My invention is also provided with means for watering plants as fast as they are set, the same comprising a measuring arrangement which delivers a limited and predetermined dose of water on each plant after it is set; and in the most improved form of my machine the quantity delivered is made adjustable.

My invention is also provided with means whereby the spacing of the plants in each row may be regulated to various distances in accordance with the character of the soil and plants.

A special feature of my machine is the improved form of plant-holder or plant-setting box, which is so constructed as to set the plant vertically and leave it so, at the same time satisfactorily covering it in with earth, so that it does not fall over after the machine has passed, and so that it is therefore unnecessary to go over the work with a hoe after the plants are set. This box or holder has a pointed or wedge-shaped end in the acute angle of which the plant rests; and one side of said box is movable and provided with means for moving it away as the plant reaches its proper position in the ground, so that the plant is left upon the ground in the position in which it is placed.

The box further comprises means whereby, in the setting of the plant and before the removal of the movable side as a support thereof, the earth is caused to fall into the holder above the root and thus act as a covering preliminary to the actual setting of the plant. Further, the box comprises means carried by the movable side whereby as it moves in the aforesaid manner, the earth so falling into the holder is pressed and packed around the root.

My plan and the several constructions and combinations which constitute the same as hereinafter set forth and claimed may best be understood by a consideration of the following description of my preferred embodiment thereof, reference being had to the accompanying drawings, in which—

Figure 1 is a side-elevation of the complete machine in position of use; Fig. 2 is a similar view with the active parts raised in the out-of-use position, as when transporting the machine from one point to another; Fig. 3 is a plan view of the complete machine; Fig. 4 is a front view of the same; Fig. 5 is a fragmentary side-view on enlarged scale of the water-measuring and delivering device; Fig. 6 is a vertical axial section of the same in the position of Fig. 5 through the axis thereof; Fig. 7 is an axial section of the same on a still larger scale, the valve-adjusting sleeve being shown in partial elevation, this view being on a horizontal axial plane with respect to Fig. 5; Fig. 8 is a fragmentary vertical transverse section on the plane 8 of Fig. 3 through the marker-adjusting device; Fig. 9 is a transverse section through the machine on a larger scale than Figs. 1 to 4, taken on the axis of the plant-wheel, the axle thereof being shown in elevation; Fig. 10 is a side-elevation of a portion of the plant-wheel carrying a plant-box or holder and the parts accessory thereto; Fig. 11 is a side-elevation of the plant-box separately from the opposite side; Fig. 12 is a front elevation of the same in the position ready for discharging the plant, showing the wheel in section; and Fig. 13 is a plan-view of the plant-holder and a portion of the wheel-rim.

The reference letters refer each to the same part in each figure of the drawings.

Although I have illustrated my invention as having but one plant-wheel, it will be clear from the following description that a larger machine might be provided with two or more plant-wheels, without substantially altering the principles of construction herein disclosed.

The apparatus has a rectangular frame A, which may be conveniently made from a channel-bar of iron or steel and which is supported by and rolls upon a pair of front wheels B and a pair of rear wheels C; these wheels are made with broad concave rims to enable them to support the weight of the machine on the soft ground without sinking in. The wheels B are mounted on axles $b'$ carried by a swiveled axle-tree D which turns upon a king-pin in the usual manner of wheeled vehicles, said king-pin (not shown) being carried by a pedestal $a'$ from the frame A. The planter as shown is arranged to be pulled by animals by means of a tongue E having a yoke at the basal end and two eyes $e'$, Fig. 4, which turn on bolts or pins $e^2$. It will be understood, however, that this is not an essential part of the invention, as the machine may be constructed to be operated by power instead of animal traction.

The rear wheels C are mounted to turn upon axles $c'$, which are carried by pedestals $c^2$ secured to the frame A, the pedestals $c^2$ being formed with sockets $c^3$, as shown in Fig. 9, in which the frame-bar A rests, and the latter is held in place by a cap-screw $c^4$ on each side of the frame. The axles $c'$ are stationary and keyed in place by transverse pins $c^5$ in their sockets $c^6$ in the pedestals $c^2$, and project inwardly from these sockets as shown, one farther than the other. The pedestals $c^2$ have also upwardly extending arms carrying sockets $c^7$ for a pair of short shafts $f'$ mounted in pivot-bearings formed on a pair of swing-bars $f^2$: these bars forming part of a double triangular frame F, each side of which is composed of the swing-bars $f^2$ and two other bars $f^3$ and $f^4$ united to the ends of the bars $f^2$, and the bars $f^3$ being united by their ends to the bars $f^4$ at an intermediate point $f^5$ of the latter, as shown in Figs. 1, 2 and 3. The bars $f^4$ extend upwardly a sufficient distance to give the necessary leverage for raising the apparatus off the ground by means of a rope or cord $f^6$, which is fastened to their ends at $f^7$, where they are united together. It will be understood that the weight upon the frame F is on the rear side of its pivotal axis, so as to cause it to swing toward the rear when released, and to occupy the position in which the plant-wheel and the apparatus connected therewith are on the ground; and to hold them in the raised position I may provide various means, that illustrated being a pair of latch-bars Y, which are loosely pivoted at $y'$ to the forward ends of the swing-bars $f^2$, and have their rear ends provided with sliding-shoes $y^2$, which rest loosely on the inwardly projecting ends of the axles $c'$. In each of the bars Y at an appropriate point is formed a notch $y^3$ (see Fig. 1) which when it comes opposite the axle $c'$ drops over the same and thus holds the frame raised. The frame is released from its raised position by means of a pair of rods $y^4$ attached to the points near the free ends of the rods Y, and chains $y^5$ attached to the bars $y^4$ and passing over the pulley $y^6$ carried by the frame F, the two chains $y^5$ being united into one and its free end being secured in any convenient manner to a suitable point on the rope or cord $f^6$, as shown in Figs. 1 and 2.

The axle G of the plant-wheel H is clamped in split sockets $f^8$, the upper half of which is hinged as shown, near the rear ends of the bars $f^2$, and the planting-wheel H is rotatably mounted on this axle, being provided with a hub-sleeve $h'$ forming the bearing-surface. It is held against lateral movement by a pair of collars $g'$, one of which may be keyed to the shaft as shown, and a pair of sleeves $g^2$ and $g^3$ inclose the axle G between the collars and the sockets $f^8$. Upon the sleeve $g^3$ is mounted a frame I whose hub $i'$ embraces said sleeve and is secured thereto by means of the set-screw $i^2$. The frame I has a depending-arm $i^3$ and a horizontal arm $i^4$, and the former of these is connected at a point below the axle G, at a pivot-pin $i^5$, with the inner end of the axle $c'$ on the same side by means of a swinging-arm J; the length of said swinging-arm being preferably the same as that between the centers of the shafts $f'$ and G upon the swinging-bar $f^2$; so that the frame I has a movement parallel to itself as it moves up and down. It is not necessary, however, that the bar J should have exactly the same length as aforesaid, as it may be found desirable or satisfactory to give it a less or greater length under some circumstances.

On the inner end of the sleeve $g^3$ is mounted a member K, said member having a split socket embracing the sleeve, and a cap-screw $k'$ by which it is clamped in place thereon, and this member has also a horizontally extending arm $k^2$, which is vertically perforated to receive a trip-rod $k^3$, and this latter is secured in place at a variable elevation by means of a set-screw $k^4$. The member K has further a downwardly extending arm $k^5$ which serves to support a lateral adjusting-screw $k^6$, whose position thereon is adjustably varied by lock-nuts $k^7$. The head $k^8$ of the set-screw $k^6$ is channeled as shown (see Figs. 10 and 12) to receive the side of the trip-rod $k^3$ whereby said set-screw is prevented from rotating, and by adjusting the positions of the nuts $k^7$, the lower end of said trip-rod $k^3$ can be adjusted forwardly or backwardly so as to operate upon the plant-boxes at the proper moment of revolution, in the manner which will be hereinafter set forth. It will be seen that the trip-rod $k^3$, being secured to the sleeve $g^3$, has a movement parallel to itself in all positions, as the axle G moves up and down with the inequalities of the ground.

The plant-wheel H, in addition to the hub $h'$ comprises the spokes $h^2$ and rim $h^3$ of a form such as to support the weight carried thereby without sinking materially in soft ground, and said rim $h^3$ has an inwardly-turned annular flange $h^4$, provided with a row of holes $h^5$ (see Fig. 10), to which are secured, by means of bolts $m'$, the plant-boxes M, said boxes being arranged at regular intervals around the circumference and dividing the same into aliquot parts. The plant-box or holder M is provided on the side adjacent to the wheel-rim with two vertical rows of bolt-holes $m^2$ spaced according to the bolt-holes $h^5$ for adjustably securing the box to the rim, the heads $m^3$ of said bolts being flattened and socketed in vertical channels $m^4$ on the inner face of the box, whereby they leave said face free from projections which might catch and tear the plant. Means are also provided for supporting the boxes M on the opposite side from the plant-wheel H; said means comprising a hub-member N perforated by a plurality of holes $n'$ in two or more concentric rows and turning loosely on the sleeve $g^3$, and a set of radius-rods O which are secured at their inner ends in the holes $n'$ as by bolts or cap-screws $o'$ and at its outer ends to the corresponding box M, a vertical row of holes $m^5$ corresponding in spacing to the holes $m^2$ being provided upon the corresponding side of the box, and a bolt $m^7$ passing through one of these holes, and a hole in the lower end of the corresponding radius-rod to secure the box thereto. Each bolt $m^7$ has preferably a flattened head $m^8$ seated in a recess $m^9$ on the inner face of the box M to avoid projection of the head beyond said face.

It will be seen from Figs. 9 and 12 that the member K with its trip-rod $k^3$ is seated on the end of the sleeve $g^3$ between the plant-wheel H and the hub-member N and therefore in the same plane as the plant-boxes M. Each of these boxes is of trough-shaped form with a sloping back, and both sides stand in vertical planes, but the bottom is cut off obliquely beginning with a point opposite the wheel-rim on the side distant therefrom, so that the box tapers to a point at the bottom. As a closure for this open bottom, I provide a swinging-member P pivoted upon a pin $p'$ carried by ears $m^{10}$ on the back of the plant-box, said bolt $p'$ passing through a lug $p^2$, which has a shoulder $p^3$ adapted to strike the back of the box when the member P is turned into the position shown in dotted lines in Fig. 11 and limit it against further movement in that direction.

The member P has an upstanding bar or extension $p^4$, the upper end of which is bent horizontally as shown at $p^5$, so as at one point in its path to encounter the trip-rod $k^3$ as the wheel turns. The trip-rod strikes the horizontal portion $p^5$ and swings the member P in the manner illustrated by the full-line position in Fig. 10 and the dotted-line position in Fig. 11, so that the lower portion thereof clears the bottom of the plant-box and allows the plant L to rest upon the ground in the hole which the pointed end of the plant-box has dug.

The lower end of the member P is of a peculiar formation which constitutes an important element of this invention. It will be observed that the material thereof is cut away, as shown at $p^6$. As the plant enters the ground the earth on the sides of the hole falls in over the depression $p^6$ and thus covers the root of the plant while still in the holder; this action being increased by means of the stirring-bars which will be presently described. Of course, the amount of cutting out of the depression $p^6$ will depend on the size of the plant; for small plants it will be more cut out than for large plants. Furthermore, the tip-end $p^7$ is turned inwardly, as clearly shown in Fig. 12, so that the earth which has fallen into the holder is pressed up around the root of the plant as the member P is swung open.

The back of the box is made sloping in order that the box itself may clear the plant while rising from the ground, and may not pull it over as would be the case if it were left radial to the wheel. It will be seen on considering the motion of the wheel in a forward direction (indicated by the arrow $x$ in Fig. 10) that as the box rises from the ground after setting the plant carried by the wheel-rim, it will gradually change its angle to the vertical, so that as it clears the ground the back will be vertical or nearly so, its actual angle with the vertical depending of course on the diameter of the wheel.

It may be supposed that in the case of backing the machine while the plant-wheel is on the ground, the extension $p^4$ on the plant-box would come up so as to get in the way of the trip-rod $k^3$, thus preventing backward movement, and to prevent this, I formerly provided a hinge in the trip-rod $k^3$; but I have found that this is unnecessary because as a matter of fact the swinging-members P on the boxes which are on the rear side of the wheel all hang open so that the transverse ends $p^5$ clear the trip-rods as they pass on. In descending they are naturally inclined to swing open as they near the vertical position, but their entrance into the ground prevents them from doing so until forced open by the action of the trip-rod, as aforesaid.

At the front of the machine and mounted upon the frame A is placed the driving-box Q having a seat $q'$, and in front of which is placed a foot-rest $q^2$. The driving-box Q may be made to form a convenient receptacle for tools or supplies, but as that forms no material element of my invention, no special construction is shown in the drawings. The rope $f^6$ for raising and lowering the planting-apparatus may be carried over this seat and secured to an eye $q^3$ or at any other suitable point. To the rear of the driver's seat on the frame A is mounted the seat R for the operator of the planting-wheel. This seat is a transverse plank suspended from stirrups $r'$ and slidably adjustable upon the frame A; and a pair of chains $r^2$ secured at one end to the bottom side of the seat R and at the opposite end to the inner ends of the axles $c'$, form foot-rests and have each a diamond-shaped mesh $r^3$ spanned by a cross-bar $r^4$ upon which the operator's feet are disposed.

The planting-machine as thus far described is operative without further complements. Its mode of operation will be fairly clear from the foregoing description. The frame F being released, the plant-wheel H sinks down upon the ground, and one of the boxes M is pressed into it by the weight of the wheel, until the rim of the latter is reached, which prevents further penetration. As the machine is drawn ahead, the plant-wheel will be revolved by the successive engagement of the plant-boxes in the ground, and as the wheel revolves, the operator seated on the seat R and carrying the plants in his hand, will place them one by one in the plant-boxes. It will be seen that the plant-wheel being on a separate axle from the frame-wheels is free to move up and down independently, while at the same time the trip-rod remains in the vertical position, so that the members P swing open always at the same point and leave the plants in the ground.

For a more perfectly-operating and complete machine, however, I have provided certain additional attachments which will now be described. On the front axle D of the machine is mounted a block S, which trails in the rear at the end of a tongue $s'$ pivoted upon a pin $s^2$ at its front end. This block S has secured to it one or more diggers $s^3$, which projecting downwardly into the ground serve to break up the earth in advance of the plant-wheel, and thereby make previous plowing and harrowing unnecessary. I wish it distinctly understood, however, that these diggers do not constitute a plow, and that they do not turn a furrow in advance of the plant-wheel as do some previous plant-machines, but merely loosen the earth so as to make it more easily penetrated by the plant-boxes. When the planting apparatus is raised, the member S with its digging devices is raised also, this being accomplished by means of a foot-lever $t'$, which is mounted on a horizontal rock-shaft T, which turns in bearings $t^2$ in front and at the base of the box Q. To the foot-lever $t'$ is fastened one end of a chain $t^3$ which passes over a guide-pulley $t^4$ (Figs. 1 and 2) and has its end secured to an eye $s^4$ on the block S; so that by depressing the foot-lever $t'$, the block S is raised. When so raised, it is held in the raised position by means of a latch-piece $t^5$ having a nose $t^6$ adapted to catch upon a pin $s^5$ on the block S, said latch $t^5$ being swung from a pin $t^7$ on the end of a bracket-arm $t^8$ projecting from the rear of the axle D. The latch-piece $t^5$ is in turn released from engagement with the block S when it is desired to lower the latter by pulling a chain $t^9$ secured at its lower end to the free end of the latch-piece $t^5$, and at its upper end to some point of the seat or wagon-box Q. Furthermore, I may provide markers U, one on each side of the frame, each of said markers comprising a swinging-arm with a digging-point $u'$ on its free end adapted to dig a small marking furrow in the ground, and having at its upper end a shaft $u^2$ which is at right-angles to the arm, and about which it turns as an axis. The shaft $u^2$ of each marker fits within a sleeve $u^3$ which extends transversely across the frame A and is secured thereto by cleats $u^4$. On the shaft $u^2$ is adjustably mounted a rock-arm $u^5$, the lower end of this arm being split, so that it can be set and frictionally clamped upon the shaft $u^2$ by means of bolts $u^6$, and a side-strap $u^7$ is secured to the frame A so as to pass around the outer side of a rock arm $u^5$ on each side, and thereby prevent lateral motion. It will be seen that the position of the marker can be changed so as to give a wider or narrower spacing, by shifting the shaft $u^2$ in or out of the sleeve $u^3$, it being in each case clamped in position by the bolts $u^6$.

Means for raising the markers U when the other parts are raised are also provided. The rock-shaft T has secured to its ends a pair of upstanding rock-arms $t^{10}$ to the ends of which are fastened chains $t^{11}$, each chain being secured at its other end to the upper end of the arm $u^5$, as shown; so that when the foot-lever $t'$ is depressed to raise the digging-apparatus $s^3$, the marker which happens to be in use is raised simultaneously. When so raised the markers are engaged by latch-pieces $t^{12}$, one on each side of the box Q, each being pivoted upon a pin $t^{13}$ and having a nose $t^{14}$ adapted to engage the arm $u^5$ and thereby hold it and the marker corresponding thereto in raised position. As it is desired to use only one of the markers at a time, the two latch-pieces $t^{12}$ are independently mounted and operated. Each is released separately by means of a rod $t^{15}$ connected to its free end and sliding in a staple or guide $t^{16}$ on the seat and having an eye $t^{17}$ at its upper end. It will be understood that in ordinary operation, the marker is used only on that side which is next to be planted, consequently the driver will release the marker on that side only, when the apparatus is put in use, and the other marker will remain up, as shown in Fig. 1.

The watering and covering-in devices are placed at the rear of the plant-wheel H. At the lower end of the upright bar $i^3$ of the frame I is mounted a stub-shaft $v'$, which forms a pivot for the front end of an arm V, adapted to turn freely about said pivot through a limited angle. The horizontal arm $i^4$ of the frame I is a bracket for supporting the arm V and raising it when the rest of the apparatus is raised by means of a flexible connection such as a chain $v^2$. The stub-shaft $v'$ is also the pivot for a sprocket-wheel W, and the hub of this sprocket-wheel W carries a series of radial arms $w'$, these being as herein shown three in number. At a point on the arm V at some distance from the rear of the plant-wheel is formed a slot $v^3$, in which is adjustably mounted the water-supply nozzle X, this nozzle being hollow internally and having a collar $x'$ which bears against the inner side of the arm V and on the outer side a screw-thread $x^2$ with which engages a nut $x^3$, which presses a washer $x^4$ against the outer side of the arm V and thus clamps the nozzle in place in the slot $v^3$. The neck of the member X which lies within the slot $v^3$ is provided with a square or rectangular lug $x^{16}$ which prevents it from rotating in said slot. On the opposite side of the collar $x'$ the nozzle is tapered and closed at the end, carrying a threaded stud $x^5$. An aperture $x^6$ connects the internal passageway $x^7$ with the exterior near the closed end thereof, said aperture being on the lower side, and upon the tapered end is fitted a tapered sleeve $x^8$ having a corresponding aperture $x^9$. The sleeve $x^8$, shown partly in plan in Fig. 7, has on its edge which is adjacent to the collar $x'$ a series of notches $x^{10}$, any of which is adapted to engage with a transverse pin $x^{11}$, or any lateral projection at the base of the tapered portion of the member X; so that the effective freeway for the passage of water through the aperture $x^6$, $x^9$ will be altered and adjusted at will by engaging different notches $x^{10}$ with the pin or projection $x^{11}$. Over and upon the sleeve $x^8$ is mounted in turn the rotary valve-member $x^{12}$ of the water-measuring device, which makes a neat joint with the sleeve so as to prevent the escape of water, and this is held in place and leakage prevented by means of a nut $x^{13}$ engaging the screw-stud $x^5$, a metal washer $x^{14}$ under said nut, and a gasket $x^{15}$ of flexible material such as rubber under the washer. The opposite end of the valve-member $x^{12}$ abuts upon a bar $z'$ placed over the collar $x'$, for the purpose hereinafter described. The rotary member $x^{12}$ has formed thereon sprocket-teeth $x^{17}$ whereby it is mechanically connected through the medium of a sprocket-chain $v^4$ with the ratchet-wheel W, and the chain is kept taut for the varying positions of the member X by a pair of idlers or tightening pulleys $v^5$ which are mounted on stub-shafts $v^6$ on the end of a bar $v^7$, this latter bar being mounted to swing upon a pivot $v^8$ and being confined to its proper position by a bolt $v^9$ adjustable in a slot $v^{10}$.

The rotary hub-member $x^{12}$ of the water-measuring device is provided with a plurality of radial screw-threaded apertures $x^{19}$ adapted to register with the aperture $x^6$ and mounted therein are radial tubular delivery-pipes $x^{20}$. It should be observed that the number of delivery-pipes $x^{20}$ is the same as as that of the arms $w'$.

Each of the radius-bars O is provided at its outer end with a right-angled extension or trip-finger $o^2$, which extends across the path of the arms $w'$; and as the plant-wheel rotates and a trip-finger $o^2$ comes opposite one of the arms $w'$, it rotates the sprocket- sprocket-wheel W is connected to the hub- the angle between the two adjacent arms, in this case 120 degrees; and as the sprocket-wheel W is connected to the hub-member $x^{12}$, the latter is rotated through a corresponding distance and for each box therefore one of the delivery-pipes $x^{20}$ is brought into a position adjacent to the plant previously planted and water delivered thereupon, the amount of water so delivered being gaged by regulating the aperture $x^6$, $x^9$.

The water-supply is provided by a tank $x^{21}$ mounted on the rear-end of the frame, said tank having a cover $x^{22}$ closing the filling aperture, and said tank having further a nozzle $x^{23}$ at the bottom to which is attached a rubber hose $x^{24}$. On the screw-threaded end $x^{21}$ of the member X is placed an elbow $x^{25}$, to which is connected the end of the hose 24, a regulating-cock $x^{26}$ being preferably interposed which serves for the further regulation of the dosage.

On the end of the arm V is secured an extension $z'$ thereof, which serves to support a covering-device Z, this latter consisting of a standard $z^2$ carrying an obliquely set plate $z^3$. The bar $z'$ is provided with a plurality of holes $z^4$ by which it may be secured in various positions to the bar V. Co-operating with the covering-device Z are spatulated-ends $w^2$ which are formed on the arms $w'$ and are adapted to extend a slight distance into the ground and loosen and raise the earth at one side of the plant, so that this loosened earth is subsequently gathered by the covering-devices Z and thrown in upon the plant to cover the same.

It will be understood of course that the distance of the water-device from the plant-wheel will vary according to the number of plant-boxes on the wheel, this distance being effectively the spacing of the plants, so that the delivery-pipes $x^{20}$ will direct their streams of water upon the plant immediately in the read of the one that is being set.

From the above description it will be readily seen that my invention is not limited to special forms and mechanical constructions such as I have hereinabove shown by way of illustration, but that the principles thereof are expressible in a variety of ways as will be well understood by those skilled in the art; therefore the scope of my claims is to be interpreted in view of such alternative constructions.

Having thus described my invention, what I claim as new and desire to secure by Letters Patent is:

1. In a plant-setting machine, in combination with a wheel having a plurality of circularly disposed and equidistant holes about the periphery thereof, a plurality of plant-holding devices each having flanges perforated by a plurality of radial holes, the distance apart of the holes in the two flanges being equal to a multiple of the whole spacing on the wheel, and fastening devices such as bolts adapted to pass through the holes in said flanges and said wheel-periphery; the arrangement being such as to permit the boxes being set at any point on the periphery of the wheel and at any degree of radial projection from said periphery.

2. In a plant-setting machine, a plant-setting wheel comprising a large diametered wheel-member, a disk-member turning co-axially therewith, each having in its periphery the same number of equidistant spaced holes, a plurality of plant-boxes having means for securing them to any of said holes in said wheel-member and having a plurality of radially disposed holes whereby said plant-boxes may be adjustably positioned in a radial direction, radius-bars secured to the opposite sides of said plant-boxes and radially adjustable with respect thereto, and means for securing the inner ends of said radius-bars to the holes in said disk-member.

3. In a plant-setting machine, a plant-setting wheel comprising a large-diametered wheel-member, a disk-member turning co-axially therewith, said wheel-member and disk-member each having in its periphery the same number of equidistantly spaced holes, a plurality of plant-boxes having means for securing them to any of said holes in said wheel-member at any desired aliquot spacing, and spoke-bars detachably secured to said plant-boxes and said disk-member.

4. A plant-setting machine comprising, in combination, a horizontal frame, a pair of wheels pivotally supporting the front end thereof, a transverse axle on said frame at the rear of said wheels, a plant-wheel rotatably mounted on said axle and supporting said frame, plant-boxes secured to said plant-wheel projecting from the periphery thereof and having means for holding a plant, and a seat mounted transversely in front of said plant-wheel and facing the latter.

5. In a plant-setting machine, in combination with a horizontal supporting-frame, a plant-wheel rotatably mounted on said frame, a seat transversely mounted in front of said wheel and facing it, plant-boxes carried by said wheel, and one or more foot-rests comprising divided chains swung from said frame in a longitudinal direction and cross-members transverse to said chains and supported at their ends by the respective branches of said chains.

6. A plant-setting machine comprising, in combination, a substantially horizontal longitudinal frame, one or more circular wheels rotatably mounted at the forward end of said frame supporting the same, means for propelling said frame in a forward direction, one or more plant-setting wheels rotatably mounted at the rear end of said frame and supporting the latter, each of said wheels having a circular periphery, and a plurality of plant-setting boxes adjustably mounted on the periphery of said plant-setting wheel or wheels whereby they project beyond the latter and are caused to form depressions in the ground by the rotation of said wheel or wheels.

7. In a plant-setting machine, the combination of a wheeled frame, a second frame pivoted thereto upon a horizontal axis, a planting-wheel rotatably mounted on said second frame to the rear of its pivotal mounting, plant-boxes mounted on said plant-wheel and projecting from the rim thereof and adapted to be depressed into the ground by weight thereof and by engagement with the ground to rotate the wheel, and means for raising said frame and holding it raised whereby to carry said plant-wheel in the elevated position when not in use.

8. In a plant-setting machine, the combination of a wheeled frame, a second frame pivoted thereto upon a horizontal axis, a plant-wheel rotatably mounted on said second frame to the rear of its pivotal mounting, plant-boxes mounted on said plant-wheel and projecting from the rim thereof and adapted to be depressed into the ground by weight thereof and by engagement with the ground to rotate the wheel, a third frame pivotally mounted on said second frame, means for holding said third frame in a substantially constant angular position whereby it moves parallel to itself in rising and falling with the plant-wheel, a water-measuring device, a rotary member provided with radial arms mounted on said third frame and operatively connected with said water-measuring device, and a series of trips carried by said plant-wheel corresponding in number to said boxes and adapted to turn said rotary member through a predetermined angle for each box.

9. In a plant-setting machine, the combination of a wheeled frame, a second frame pivoted thereon, a plant-wheel rotatably mounted on said second frame to the rear of its pivot, said second frame having an upwardly extending arm which may be drawn forwardly in order to raise said wheel, and means for holding said second frame in the raised position.

10. In a plant-setting machine, the combination of a wheeled frame, a second frame pivoted thereon, a plant-wheel rotatably mounted on said second frame to the rear of its pivot, said second frame having an upwardly extending arm which may be drawn forwardly in order to raise said wheel, and a latch-device carried by said second frame and adapted to engage in the raised position thereof with an element on said wheeled frame whereby to maintain said second frame in said raised position.

11. The combination of a wheeled frame having a pair of pivotal axes, a swing-bar turning about one of said axes, a parallel bar turning upon the other axis, a member pivoted to both said swing-bar and said parallel bar in parallelogram-style whereby said member has substantially a parallel movement, a trip carrier connected with said member and partaking of its movement, a plant-wheel mounted to rotate about an axis which partakes of the motion of said member, and a plurality of plant-boxes carried by said wheel and having each a member adapted to be operated by said trip.

12. The combination of a wheeled frame having a pair of pivotal axes, a swing-bar turning about one of said axes, a parallel bar turning upon the other axis, a member pivoted to both said swing-bar and said parallel bar in parallelogram-style whereby said member has substantially a parallel movement, a trip fixed with respect to said member and partaking of its movement, an axle carried by said member and acting as a pivot for said swing-bar, a plant-wheel turning on said axle, and a number of plant-boxes carried by said plant-wheel and having each a plant-discharging member adapted to be operated by said trip.

13. The combination of a wheeled frame having a pair of pivotal axes, a swing-bar turning about one of said axes, a parallel bar turning upon the other axis, a member pivoted to both said swing-bar and said parallel bar in parallelogram-style whereby said member has substantially a parallel movement, a trip fixed with respect to said member and partaking of its movement, a plant-wheel rotatably mounted to rotate about an axis which partakes the motion of said member, a plurality of plant-boxes carried by said wheel and having each a member adapted to be operated by said trip, a rearwardly-extending bar mounted on said member and having an independent movement with respect thereto through a limited angle, a rotary water-measuring device mounted on the rear part of said rearwardly extending bar, a plurality of trips equal to the number of plant-boxes carried by said plant-wheel, and means mounted on said member opposite said plant-wheel adapted to be engaged intermittently by said trips and connected with said water-measuring device to concomitantly operate the latter.

14. The combination of a wheeled frame having a pair of pivotal axes, a swing-bar turning about one of said axes, a parallel bar turning upon the other axis, a member pivoted to both said swing-bar and said parallel bar in parallelogram-style whereby said member has substantially a parallel movement, a trip rigidly connected with said member and partaking of its movement, a plant-wheel mounted to rotate about an axis which partakes the motion of said member, a plurality of plant-boxes carried by said wheel and having each a member adapted to be operated by said trip, a rearwardly-extending bar mounted on said member and having an independent movement with respect thereto through a limited angle, a rotary water-measuring device mounted on the rear part of said rearwardly extending bar, a plurality of trips equal to the number of plant-boxes carried by said plant-wheel, means mounted on said member opposite said plant-wheel and adapted to be engaged intermittently by said trips and connected with said water-measuring device to concomitantly operate the latter, and a share acting as a scraper mounted on the rear end of said rearwardly-extending bar and resting upon the ground and adapted to cover any loose earth over each plant as it passes it.

15. A plant-setting machine comprising in combination a wheeled frame, a wagon-box and seat at the front end thereof, a water-tank at the rear-end, a second frame pivotally mounted on said first frame intermediately thereof, a member pivotally connected to said second frame, a parallel bar pivoted to said wheeled frame and said member in such manner as to give a parallel motion to the latter, a trip-bar connected rigidly with said member, a second wheel rotatably mounted on an axis which is fixed with respect to said member and partakes of the up-and-down motion thereof, plant-boxes fixed to and projecting radially from the rim of said wheel, each of said boxes having a movable plant-discharging member which is adapted to be operated by said trip when in the plant-setting position, a rotary head carried by said member having equidistant radial spokes, a plurality of laterally projecting elements on said plant-wheel adapted to engage successively with said spokes and thereby rotate said head through an angle equal to that between two successive spokes, a rearwardly-extending bar pivotally mounted on said member, a covering-in-device mounted on the rear end of said rearwardly-extending bar and adapted to drag on the ground and throw the loose earth over the said plants, a water-measuring device mounted on said bar in front of said device and to the rear of the plant-setting wheel, a connection between said water-tank and said measuring-device, said measuring-device having a rotary valve-member provided with a plurality of radial outlets adapted to deliver water in successive dosages upon the set plants, a connection between said rotary head and said rotary valve-member whereby they are rotated concomitantly, an operator's seat mounted transversely on said frame in front of said plant-setting wheel, and an operating-lever-arm whereby said member, a plant-wheel, rearwardly extending bar, plant-boxes, rotary head, and watering-device and covering-in-device may be concomitantly elevated above the ground.

16. In a plant-setting machine, the combination of a rotary plant-setting device, a rotary head mounted opposite to said plant-setting device and having mechanical connection with said plant-setting device whereby it is rotated therefrom, a water-measuring device mounted at the rear of said rotary head and adjustable toward and from the latter, an endless flexible connection mechanically connecting said head and water-measuring device and operating the latter from the former, and a tightening device adapted to spread the opposite laps of said endless flexible connection and thereby to take up a variable length of slack therein.

17. In a plant-setting machine, the combination of a rotary plant-setting device, a rotary head mounted opposite thereto and carrying sprocket-teeth, mechanical means for rotating said head from said plant-setting device, a rearwardly extending bar, a water-measuring device mounted on said bar and adjustable toward and from said head, said measuring-device having a rotary valve-member provided with sprocket-teeth, an endless sprocket-chain passing over the sprocket-teeth on said head and valve-member and mechanically connecting them, a swinging-arm mounted on said bar intermediately between said head and measuring-device, a pair of tightener pulleys mounted on the opposite ends of said arm and adapted to bear against the opposite laps of said chain, and means for setting said arm at various angles with said bar.

In witness whereof I have hereunto set my hand in the presence of two witnesses.

JULIUS RIEMENSCHNEIDER.

Witnesses:
   EUGENE W. COLLIS,
   W. SCHULTZ, Jr.

Copies of this patent may be obtained for five cents each, by addressing the "Commissioner of Patents, Washington, D. C."